(12) United States Patent
Kanna et al.

(10) Patent No.: US 12,280,363 B2
(45) Date of Patent: Apr. 22, 2025

(54) COMPOSITION FOR DISPERSED HYDRODESULFURIZATION CATALYST AND PROCESS FOR PREPARATION OF THE SAME

(71) Applicant: Hindustan Petroleum Corporation Limited, Bengaluru (IN)

(72) Inventors: Narasimharao Kanna, Bengaluru (IN); Pradyut Dhar, Bengaluru (IN); Valavarasu Gnanasekaran, Bengaluru (IN); Ramachandrarao Bojja, Bengaluru (IN)

(73) Assignee: Hindustan Petroleum Corporation Limited, Bengaluru (IN)

( * ) Notice: Subject to any disclaimer, the term of this patent is extended or adjusted under 35 U.S.C. 154(b) by 538 days.

(21) Appl. No.: 17/420,669

(22) PCT Filed: Aug. 21, 2020

(86) PCT No.: PCT/IN2020/050728
§ 371 (c)(1),
(2) Date: Jul. 3, 2021

(87) PCT Pub. No.: WO2021/161328
PCT Pub. Date: Aug. 19, 2021

(65) Prior Publication Data
US 2022/0323944 A1     Oct. 13, 2022

(30) Foreign Application Priority Data
Feb. 11, 2020   (IN) .............................. 202041005951

(51) Int. Cl.
*B01J 27/19*   (2006.01)
*B01J 35/10*   (2006.01)
(Continued)

(52) U.S. Cl.
CPC ............. *B01J 27/19* (2013.01); *B01J 35/615* (2024.01); *B01J 35/633* (2024.01);
(Continued)

(58) Field of Classification Search
CPC .......... B01J 27/19; B01J 35/615; B01J 37/20; C10G 45/08
See application file for complete search history.

(56) References Cited

U.S. PATENT DOCUMENTS 7,235,173 B2   6/2007   Diehl et al.
11,034,894 B2  6/2021   Girard et al.
(Continued)

FOREIGN PATENT DOCUMENTS

CN   101376829 A  *  3/2009
EP   1380343 A1    1/2004
(Continued)

OTHER PUBLICATIONS

Castillo-Villalon et al., "Analysis of the role of citric acid in the preparation of highly active HDS catalysts", Journal of Catalysis, 320, (2014) 127-136.*

(Continued)

*Primary Examiner* — Jun Li
(74) *Attorney, Agent, or Firm* — Blank Rome LLP

(57) ABSTRACT

The present disclosure describes a hydrodesulfurization (HDS) catalyst, a process for preparation of the catalyst, and a method of hydro-desulfurizing a hydrocarbon feedstock using the hydrodesulfurization catalyst.

16 Claims, 3 Drawing Sheets

(51) Int. Cl.
  *B01J 35/61* (2024.01)
  *B01J 35/63* (2024.01)
  *B01J 37/02* (2006.01)
  *B01J 37/08* (2006.01)
  *B01J 37/20* (2006.01)

(52) U.S. Cl.
  CPC ........... *B01J 37/0236* (2013.01); *B01J 37/08* (2013.01); *B01J 37/20* (2013.01)

(56) References Cited

U.S. PATENT DOCUMENTS

| | | | |
|---|---|---|---|
| 2013/0153467 A1* | 6/2013 | Seki | B01J 21/063 502/220 |
| 2017/0073592 A1 | 3/2017 | Nonaka et al. | |
| 2018/0100107 A1 | 4/2018 | Alhooshani et al. | |
| 2019/0185764 A1* | 6/2019 | Girard | B01J 35/613 |
| 2022/0062874 A1* | 3/2022 | Devers | B01J 27/19 |

FOREIGN PATENT DOCUMENTS

| | | | | |
|---|---|---|---|---|
| EP | 3498370 A1 | 6/2019 | | |
| JP | 2005305418 A | * | 11/2005 | ............ B01J 21/12 |
| JP | 2013027847 A | * | 2/2013 | |
| JP | 2015/167936 A | | 9/2015 | |
| WO | WO-2014013154 A1 | * | 1/2014 | ............ B01D 3/009 |

OTHER PUBLICATIONS

Machine translation of CN101376829A, publication date Mar. 4, 2009.*
International Search Report & Written Opinion for PCT/IB2020/050728 dated Nov. 11, 2020, 16 pgs.
K. Kobayashi, et al., "Active Sites of Sulfided NiMo/Al$_2$O$_3$ Catalysts for 4,6-dimethyldibenzothiophene Hydrodesulfurization-effects of Ni and Mo Components, Sulfidation, Citric Acid and Phosphate Addition", Catalysis Today, vol. 292, 2017, pp. 74-83.
Japanese Office Action for JP 2021-534728 dated Jul. 20, 2022, 5 pgs.

* cited by examiner

COMPOSITION FOR DISPERSED HYDRODESULFURIZATION CATALYST AND PROCESS FOR PREPARATION OF THE SAME

RELATED APPLICATIONS

The present application is a national phase of PCT/IN2020/050728, filed Aug. 21, 2020, which claims the benefit of Indian patent application Ser. No. 202041005951, filed Feb. 11, 2020. The entire disclosures of which are hereby incorporated by reference.

FIELD OF INVENTION

The present disclosure relates to the field of petroleum industry. In particular, it relates to a catalyst and its performance for improving hydrodesulfurization of hydrocarbon fuel/feedstock in the petroleum industry.

BACKGROUND OF THE INVENTION

Petroleum feedstocks often contain sulfur compounds in minor amounts, such as mercaptans, thiophenes and the like. Such compounds are known to be highly undesirable, particularly in gasoline, wherein increased amounts of an anti-knock compound, such as tetraethyl lead is added. Hydrodesulfurization is the principal means by which sulfur content of petroleum feedstocks are reduced and the organic sulfur compounds are reacted with hydrogen in the presence of a hydrogenation catalyst to convert the sulfur to hydrogen sulfide, which is more readily removed. Typically, such hydrogenation catalysts contain metal oxides from Ni, Co, Mo, W. These metal oxides are then deposited on alumina supports which are sulfided to get the active catalyst. The deposition of these metals is carried out by wet impregnation of the metal solution on extrudates.

Moreover, γ-$Al_2O_3$ has been widely used as a catalyst support for hydrotreating catalysts, but it strongly interacts with the active phase metal ($MoO_3$) in a mono-layered tetrahedral coordination. This interaction inhibits active phase reduction, which in turn decreases catalytic activity compared to octahedral molybdenum.

US20180100107 discloses a single-pot method of producing a hydrodesulfurization catalyst by hydrothermally treating a hydrothermal precursor that includes a silica source, a structural directing surfactant, an aqueous acid solution, and metal precursors that contain active catalyst materials. There are many issues related to the performance and use of hydrodesulfurization catalysts, such as high capital and operating cost.

Apart from this, to prevent air contamination in the crowded cities, ultra-low sulfur fuels are required, wherein the sulfur concentration is reduced to 10 ppm or lower. Zero sulfur emissions are a desirable goal. These stringent requirements will need advanced hydrodesulfurization processes and catalysts.

Although numerous attempts have been made in the past for the catalytic removal of the sulfur from the petroleum feedstocks, there still exists a need to develop a more economical and simple process for hydrodesulfurization using a catalyst with improved activity and/or stability. Hydrodesulfurization catalyst with an activity more than double that of conventional hydrodesulfurization catalysts is the need of the hour.

SUMMARY OF THE INVENTION

In an aspect of the present disclosure, there is provided a hydrodesulfurization (HDS) catalyst comprising (a) a first metal oxide having weight percentage in the range of 4-9% with respect to the total weight of the catalyst; (b) a second metal oxide having weight percentage in the range of 15-26% with respect to the total weight of the catalyst; (c) a third metal oxide having weight percentage in the range of 4-7% with respect to the total weight of the catalyst; (d) at least one porous support having weight percentage in the range of 40-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$.

In an aspect of the present disclosure, there is provided a hydrodesulfurization (HDS) catalyst comprising: (a) phosphorus oxide having weight percentage in the range of 4-9% with respect to the total weight of the catalyst; (b) molybdenum oxide having weight percentage in the range of 15-26% with respect to the total weight of the catalyst; (c) nickel oxide having weight percentage in the range of 4-7% with respect to the total weight of the catalyst; (d) at least one porous support having weight percentage in the range of 40-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$.

In another aspect of the present disclosure, there is provided a process of preparing the catalyst comprising: (i) phosphorus oxide having weight percentage in the range of 4-9% with respect to the total weight of the catalyst; (ii) molybdenum oxide having weight percentage in the range of 15-26% with respect to the total weight of the catalyst; (iii) nickel oxide having weight percentage in the range of 4-7% with respect to the total weight of the catalyst; (iv) at least one porous support having weight percentage in the range of 40-65% with respect to the total weight of the catalyst; and (v) at least one chelating agent having weight percentage in the range of 1-7% with respect to the catalyst, wherein the hydrodesulfurization catalyst has a BET surface area in the range of 155 to 210 $m^2/g$, the process comprising: (a) impregnating a phosphorus oxide precursor on at least one porous support, followed by drying and calcination to obtain a first precursor; (b) dispersing a molybdenum oxide precursor on the first metal precursor in presence of at least one chelating agents, followed by ageing, drying, and calcination to obtain a second precursor; and (c) impregnating a nickel oxide precursor on the second precursor in the presence of at least two chelating agents, followed by drying to obtain the catalyst.

In yet another aspect of the present disclosure, there is provided a method of hydrodesulfurizing a hydrocarbon feedstock, the method comprising: contacting the hydrocarbon feedstock comprising at least one sulfur-containing hydrocarbon compound with the hydrodesulfurization catalyst comprising: (i) phosphorus oxide having weight percentage in the range of 4-9% with respect to the total weight of the catalyst; (ii) molybdenum oxide having weight percentage in the range of 15-26% with respect to the total weight of the catalyst; (iii) nickel oxide having weight percentage in the range of 4-7% with respect to the total weight of the catalyst; (iv) at least one porous support having weight percentage in the range of 40-65% with respect to the total weight of the catalyst; and (v) at least one chelating agent having weight percentage in the range of 1-7% with respect to the catalyst, wherein the hydrodesulfurization catalyst has a BET surface area in the range of 155 to 210 $m^2/g$, in the presence of hydrogen gas to hydro-desulfurize the at least one sulfur-containing hydrocarbon compound to form hydrogen sulfide and a hydro-desulfurized hydrocarbon compound, wherein the hydrocarbon feedstock is contacted with the hydrodesulfurization catalyst at a temperature in the range of 200 to 500° C.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWING

The detailed description is described concerning the accompanying figure. In the figure, the left-most digit(s) of a reference number identifies the figure in which the reference number first appears. The same numbers are used throughout the drawings to reference like features and components.

DETAILED DESCRIPTION OF THE INVENTION

Figure 1:
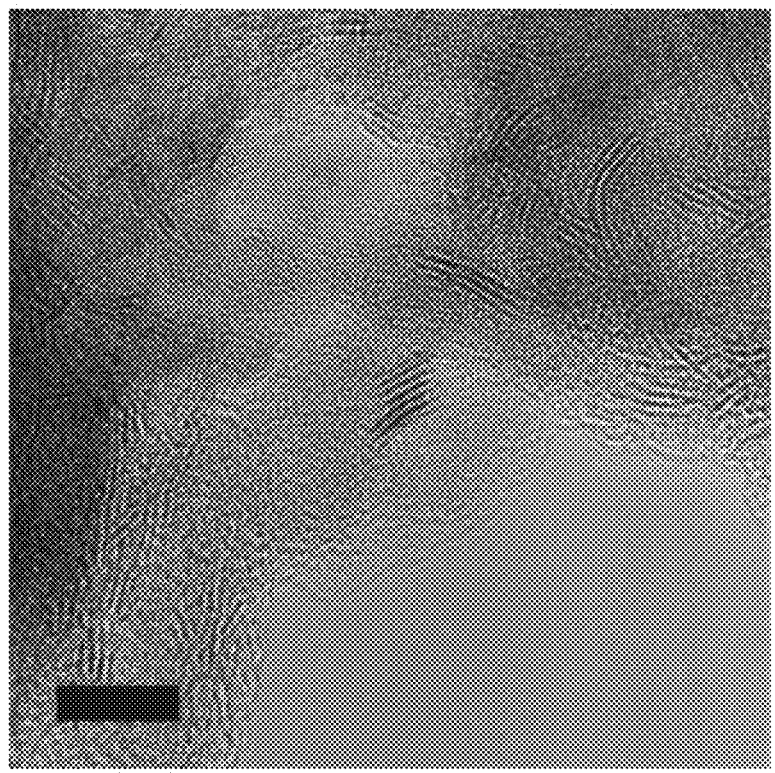
FIG. 1 illustrates transmission electron microscopic image confirming the metal dispersion on the catalyst, in accordance with an implementation of the present disclosure.

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight percentage range of about 40-65% should be interpreted to include not only the explicitly recited limits of about 40% to about 65%, but also to include sub-ranges, such as 45%, 50%, 55%, and so forth, as well as individual amounts, including fractional amounts, within the specified ranges, such as 45.2%, 50.5%, and 55.7%, for example.

The term "BET surface area" refers to a surface area of the hydrodesulfurization catalyst of the present disclosure. The surface area the catalyst is an important factor in catalytic activity. It is the process of preparation which is critical in achieving the desired surface areas. The hydrodesulfurization catalyst of the present disclosure has a BET surface area in the range of 155 to 210 $m^2/g$.

The term "surface acidity" refers to the Bronsted acidity of the catalyst. Typically, Typically, changes in surface acidity are observed due to the nature of the additives. The higher the surface acidity better is the performance of the catalyst. The process of preparing the catalyst of the present disclosure incorporates active metals which improves the surface acidity considerably. The catalyst of the present disclosure has a surface acidity in the range of 0.3 to 0.5 mmol/g.

The term "hydrocarbon feedstock" refers to a hydrocarbon reservoir. The hydrocarbon feedstock may be a crude oil that is produced from an oil well, particularly from a sour gas oil well. Alternatively, the hydrocarbon feedstock may be a gaseous stream that is supplied directly from an offshore or an onshore well, or a sulfur-containing liquid or gaseous stream. e.g. gaseous ethane, liquid gasoline, liquid naphtha, etc. in a refinery or a petrochemical plant that needs to be hydrodesulfurized.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific implementations described herein, which are intended for the purposes of exemplification only. Functionally-equivalent products, compositions, and methods are clearly within the scope of the disclosure, as described herein.

As discussed in the background section that although there have been numerous attempts for the catalytic removal of sulfur from the petroleum feedstocks, but they still need to be tuned very precisely to obtain high-performance operation. For instance, the alumina support can be modified by the incorporation of new additives with complementary surface properties with enormous possibilities to ameliorate the metal-support interaction, which could improve the morphology of the active phases and sites introducing better selectivity and with long-term stability. Thus, the present disclosure provides a hydrodesulfurization catalyst wherein molybdenum was deposited on the alumina support at a particular pH window by spray impregnation. While depositing molybdenum, chelating agents were also added to enhance the dispersion. The combination of spray impregnation and chelating agents like citric acid and glutamic acid was employed to achieve better dispersion of molybdenum on the supports. This enhancement of dispersion brings down the sulfidation temperature compared to wet impregnation without chelating agents. Additionally, nickel was impregnated on the porous substrate after molybdenum deposition, along with chelating agents (a combination of citric acid and glutamic acid). Unlike the conventional processes wherein wet impregnation method is employed in the preparation of catalyst and the final catalyst is calcined, the catalyst of the present disclosure was prepared by spray impregnation and the final catalyst was not calcined. Spray-impregnated nickel along with chelating agents and un-calcined final catalyst slowed down the formation of $NiS_2$ and apparently $MoS_2$ was formed first followed by nickel substitution at edges. The process of preparation of the catalyst of the present disclosure decreased the interaction between nickel, molybdenum and alumina which was evident in temperature-programmed reduction. Compared to the conventional wet impregnation method for the preparation of the catalyst, the interaction between the support and the active phase was found to be lower in the catalyst prepared by the process of the present disclosure.

In an embodiment of the present disclosure, there is provided a hydrodesulfurization catalyst comprising: (a) a first metal oxide having weight percentage in the range of 4-9% with respect to the total weight of the catalyst; (b) a second metal oxide having weight percentage in the range of 15-26% with respect to the total weight of the catalyst; (c) a third metal oxide having weight percentage in the range of 4-7% with respect to the total weight of the catalyst; (d) at least one porous support having weight percentage in the range of 40-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$.

In an embodiment of the present disclosure, there is provided a hydrodesulfurization catalyst as described herein, wherein the first metal oxide is phosphorus oxide; the second metal oxide is selected from the group consisting molybdenum oxide, tungsten oxide, and combinations thereof; and the third metal oxide is selected from the group consisting of cobalt oxide, nickel oxide, and combinations thereof.

In an embodiment of the present disclosure, there is provided hydrodesulfurization catalyst as described herein, which comprises the first metal oxide, the second metal oxide, the third metal oxide among others. The first metal oxide is prepared from a first metal oxide precursor. The first metal oxide precursor is selected from the group consisting of orthophosphoric acid, diammonium hydrogen phosphate, or ammonium dihydrogen phosphate, hypophosphorous acid. The second metal oxide is prepared from a second metal oxide precursor. The second metal oxide precursor is selected from ammonium heptamolybdate, molybdophosphic acid, molybdenum oxide, molybdenum chloride, ammonium meta tungstate or tungsten chloride. The third metal oxide is prepared from a third metal oxide precursor. The third metal oxide precursor is selected from nickel acetate, nickel nitrate, nickel acetylacetonate, nickel chloride, cobalt nitrate, cobalt acetate or cobalt acetvlacetonate.

In an embodiment of the present disclosure, there is provided a hydrodesulfurization (HDS) catalyst comprising: (a) phosphorus oxide having weight percentage in the range of 4-9% with respect to the total weight of the catalyst; (b) molybdenum oxide having weight percentage in the range of 15-26% with respect to the total weight of the catalyst; (c) nickel oxide having weight percentage in the range of 4-7% with respect to the total weight of the catalyst; (d) at least one porous support having weight percentage in the range of 40-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$. In another embodiment of the present disclosure, there is provided a hydrodesulfurization (HDS) catalyst comprising: (a) phosphorus oxide having weight percentage in the range of 4-7% with respect to the total weight of the catalyst; (b) molybdenum oxide having weight percentage in the range of 15-20% with respect to the total weight of the catalyst; (c) nickel oxide having weight percentage in the range of 4-6% with respect to the total weight of the catalyst; (d) at least one porous support having weight percentage in the range of 45-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$. In yet another embodiment of the present disclosure, there is provided a hydrodesulfurization (HDS) catalyst comprising: (a) phosphorus oxide having weight percentage in the range of 4-7% with respect to the total weight of the catalyst; (b) molybdenum oxide having weight percentage in the range of 15-20% with respect to the total weight of the catalyst; (c) nickel oxide having weight percentage in the range of 4-6% with respect to the total weight of the catalyst; (d) at least one porous support having weight percentage in the range of 45-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$.

In an embodiment of the present disclosure, there is provided a hydrodesulfurization catalyst as described herein, wherein the catalyst has a surface acidity in the range of 0.3 to 0.5 mmol/g.

In an embodiment of the present disclosure, there is provided a hydrodesulfurization catalyst as described herein, wherein the catalyst has a total pore volume in the range of 0.3 to 0.45 $cm^3/g$, and an average pore size in the range of 6 to 12 nm.

In an embodiment of the present disclosure, there is provided a hydrodesulfurization catalyst as described herein, wherein at least one porous support is selected from $Al_2O_3$, $TiO_2$, $SiO_2$, $SiO_2$—$Al_2O_3$, or zeolite-Y.

In an embodiment of the present disclosure, there is provided a hydrodesulfurization catalyst as described herein, wherein at least one porous support is selected from γ-Al$_2$O$_3$ TiO$_2$, SiO$_2$, SiO$_2$—Al$_2$O$_3$, or zeolite-Y.

In an embodiment of the present disclosure, there is provided a hydrodesulfurization catalyst as described herein, wherein at least one porous support is γ-Al$_2$O$_3$.

In an embodiment of the present disclosure, there is provided a hydrodesulfurization catalyst as described herein, wherein the at least one chelating agent is selected from citric acid, glutamic acid, nitriloacetic acid, glutaric acid, or succinic acid.

In an embodiment of the present disclosure, there is provided a hydrodesulfurization catalyst as described herein, wherein the at least one chelating agent is selected from citric acid, glutamic acid, nitriloacetic acid, or glutaric acid.

In an embodiment of the present disclosure, there is provided a hydrodesulfurization catalyst as described herein, wherein the at least one chelating agent is citric acid.

In an embodiment of the present disclosure, there is provided a hydrodesulfurization catalyst as described herein, wherein the at least one chelating agent is glutamic acid.

In an embodiment of the present disclosure, there is provided a hydrodesulfurization catalyst as described herein, wherein the at least one chelating agent is a combination of citric acid and glutamic acid.

In an embodiment of the present disclosure, there is provided a process of preparing the catalyst as described herein, the process comprises (a) impregnating a phosphorus oxide precursor on at least one porous support, followed by drying and calcination to obtain a first precursor; (b) dispersing a molybdenum oxide precursor on the first metal precursor in presence of at least one chelating agent, followed by ageing, drying, and calcination to obtain a second precursor; and (c) impregnating a nickel oxide precursor on the second precursor in the presence of at least one chelating agent, followed by drying to obtain the catalyst.

In an embodiment of the present disclosure, there is provided a process of preparing the catalyst as described herein, the process comprises (a) impregnating a phosphorus oxide precursor on at least one porous support, followed by drying and calcination to obtain a first precursor; (b) dispersing a molybdenum oxide precursor on the first metal precursor in presence of at least two chelating agent, followed by ageing, drying, and calcination to obtain a second precursor; and (c) impregnating a nickel oxide precursor on the second precursor in the presence of at least two chelating agent, followed by drying to obtain the catalyst. In another embodiment of the present disclosure, the at least two chelating agents is a combination of citric acid and glutamic acid.

In an embodiment of the present disclosure, there is provided a process of preparing the catalyst as described herein, wherein the phosphorus oxide precursor is selected from the group consisting of orthophosphoric acid, diammonium hydrogen phosphate, ammonium dihydrogen phosphate, hypophosphorous acid, and combinations thereof; the molybdenum oxide precursor is selected from the group consisting of ammonium heptamolybdate, molybdophosphic acid, molybdenum oxide, molybdenum chloride, and combinations thereof; the nickel oxide precursor is selected from the group consisting of nickel acetate, nickel nitrate, nickel acetylacetonate, nickel chloride, and combinations thereof.

In an embodiment of the present disclosure, there is provided a process of preparing the catalyst as described herein, wherein impregnating the phosphorus oxide precursor on at least one porous support is carried out by spray impregnation at a pH in the range of 2-5.5.

In an embodiment of the present disclosure, there is provided a process of preparing the catalyst as described herein, wherein the drying and calcination of step (a) is carried out at a temperature in the range of 400-500° C.

In an embodiment of the present disclosure, there is provided a process of preparing the catalyst as described herein, wherein dispersing the molybdenum oxide precursor on the first metal precursor in presence of at least one chelating agent is carried out at a pH in the range of 2-5.5.

In an embodiment of the present disclosure, there is provided a process of preparing the catalyst as described herein, wherein dispersing the molybdenum oxide precursor on the first metal precursor in presence of at least two chelating agents is carried out at a pH in the range of 2-5.5.

In an embodiment of the present disclosure, there is provided a process of preparing the catalyst as described herein, wherein the ageing of step (b) is carried out at a temperature in the range of 25-35° C. for a period in the range of 2-5 hours; the drying of step (b) is carried out at a temperature in the range of 80-100° C.; the calcination of step (b) is carried out at a temperature in the range of 450-600° C.

In an embodiment of the present disclosure, there is provided a process of preparing the catalyst as described herein, wherein impregnating the nickel oxide precursor on the second precursor in the presence of at least one chelating agent is carried out by spray impregnation at a pH in the range of 4.5-5.5.

In an embodiment of the present disclosure, there is provided a process of preparing the catalyst as described herein, wherein impregnating the nickel oxide precursor on the second precursor in the presence of at least two chelating agents is carried out by spray impregnation at a pH in the range of 4.5-5.5.

In an embodiment of the present disclosure, there is provided a process of preparing the catalyst as described herein, wherein the drying of step (c) is carried out at a temperature in the range of 80-100° C. for a period in the range of 5-8 hours.

In an embodiment of the present disclosure, there is provided a method of hydrodesulfurizing a hydrocarbon feedstock, the method comprising: contacting the hydrocarbon feedstock comprising at least one sulfur-containing hydrocarbon compound with the hydrodesulfurization catalyst comprising: (a) phosphorus oxide having weight percentage in the range of 4-7% with respect to the total weight of the catalyst; (b) molybdenum oxide having weight percentage in the range of 15-20% with respect to the total weight of the catalyst; (c) nickel oxide having weight percentage in the range of 4-6% with respect to the total weight of the catalyst; (d) at least one porous support having weight percentage in the range of 45-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 m$^2$/g, in the presence of hydrogen gas to hydro-desulfurize the at least one sulfur-containing hydrocarbon compound to form hydrogen sulfide and a hydro-desulfurized hydrocarbon compound, wherein the hydrocarbon feedstock is contacted with the hydrodesulfurization catalyst at a temperature in the range of 200 to 500° C.

In an embodiment of the present disclosure, there is provided a method of hydrodesulfurizing a hydrocarbon feedstock, wherein the pressure of the hydrogen gas is in the range of 2 to 10 MPa.

In an embodiment of the present disclosure, there is provided a method of hydrodesulfurizing a hydrocarbon feedstock, wherein the pressure of the hydrogen gas is in the range of 3 to 10 MPa.

In an embodiment of the present disclosure, there is provided a method of hydrodesulfurizing a hydrocarbon feedstock, wherein the pressure of the hydrogen gas is in the range of 3 to 8 MPa.

In an embodiment of the present disclosure, there is provided a method of hydrodesulfurizing a hydrocarbon feedstock, wherein the hydrocarbon feedstock to the hydrodesulfurization catalyst as described herein, weight percentage ratio is in the range of 500 g-3000 g:1000 g.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The nature of the support generally plays a key role in the morphology, dispersion, and obviously in the catalytic activity of the prepared catalysts. Lesser support interaction enhances the activity of the catalyst. The effect of support could be elucidated by extrication how the sulfide cluster interacts with the surface. During the sulfiding process, the Mo—O-$M_s$ bonds are broken and transformed into Mo—S-$M_s$ bonds, wherein the $M_s$ refers to the metal in the support. In the present disclosure, molybdenum was deposited on the alumina support at a particular pH window by spray impregnation. While depositing molybdenum, chelating agents were also added to enhance the dispersion. The combination of spray impregnation and chelating agents like citric acid and glutamic acid was employed to achieve better dispersion of molybdenum on the supports. This enhancement of dispersion brings down the sulfidation temperature compared to wet impregnation without chelating agents. Additionally, nickel was impregnated on the porous substrate after molybdenum deposition, along with chelating agents (a combination of citric acid and glutamic acid). Unlike the conventional processes wherein the wet impregnation method is employed in the preparation of catalyst and the final catalyst is calcined, the catalyst of the present disclosure was prepared by spray impregnation and the final catalyst was not calcined. Spray-impregnated nickel along with chelating agents and un-calcined final catalyst slowed down the formation of $NiS_2$ and apparently $MoS_2$ was formed first followed by nickel substitution at edges.

The present disclosure thus provides a hydrodesulfurization (HDS) catalyst comprising: (a) phosphorus oxide having weight percentage in the range of 4-9% with respect to the total weight of the catalyst; (b) molybdenum oxide having weight percentage in the range of 15-26% with respect to the total weight of the catalyst; (c) nickel oxide having weight percentage in the range of 4-7% with respect to the total weight of the catalyst; (d) at least one porous support having weight percentage in the range of 40-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$.

Experimental Details

Orthophosphoric acid was used a phosphorus precursor, ammonium heptamolybdate or molybdophosphic acid was used as molybdenum precursor, nickel acetate or nickel nitrate or nickel acetylacetonate or nickel chloride was used as nickel precursor. The materials were procured commercially and used as received without additional purification. Alumina used in the present disclosure was γ-alumina which was procured commercially and used as received without additional purification.

Example 1

Process of Preparing the Catalyst

The process of preparing the catalyst comprises the following steps:
(a) Synthesis of the first precursor: Phosphorus was loaded on alumina by spray impregnation at a pH in the range of 2-3 to obtain the phosphorus loaded alumina. The phosphorus loaded alumina was dried and calcined at 450° C. to obtain the first precursor. The procedure involves mixing 13.1 g of phosphorus oxide precursor (orthophosphoric acid ($H_3PO_4$)) to 75 g of γ-alumina at a pH in the range of 2-3 to obtain 6.55 wt % of metal in the first precursor. The process was carried out at room temperature for three hours. This mixture was stirred for 2 hours and then dried by slow evaporation at 60-70° C. prior to final calcination at 450° C. The first precursor was then dried at 100° C. for 12 hours.
(b) Synthesis of the second precursor: The second precursor was synthesized by spray impregnating molybdenum in the first precursor in two steps. In spray impregnation step molybdenum oxide precursor (ammonium heptamolybdate (27.58 g)) and 1.27 g of chelating agents (a combination of citric acid and glutamic acid) were deposited onto P-Alumina (75 g; first precursor) in two separate steps. While spray impregnating molybdenum along with the chelating agents, the pH of the impregnating solution was kept between 5-5.2. The obtained material was aged at room temperature and dried at 90° C. Further second loading of molybdenum was done by following the same procedures as discussed above. The obtained final material was then calcined at 500° C.
(c) Synthesis of catalyst: Finally, nickel loading on the second precursor was done in a single step spray impregnation in the presence of chelating agent (a combination of citric acid and glutamic acid) at a pH of 5, followed by drying at a temperature of 85° C. for a period of 6 hours.

Example 2: Alternate Process of Preparing the Hydrodesulfurization Catalyst

An alternate method of preparing the catalyst includes preparing a solution comprising the molybdenum oxide precursor and the phosphorus oxide precursor. Instead of molybdenum oxide precursor, a tungsten oxide precursor may also be used. This solution was impregnated into the γ-alumina in the presence of at least one chelating agent, followed by calcination at a temperature of 500° C. to obtain the second precursor, ammonium heptamolybdate, molybdophosphic acid, molybdenum oxide, molybdenum chloride. The tungsten oxide precursor may be selected from ammonium meta tungstate or tungsten chloride. The at least one chelating agent may be selected from citric acid, glutamic acid or a combination of citric and glutamic acid. The nickel oxide precursors were selected from nickel acetate, nickel nitrate, nickel acetylacetonate, nickel chloride. The cobalt oxide precursors were selected from cobalt nitrate, cobalt acetate or cobalt acetylacetonate.

In an example, the hydrodesulfurization catalyst comprised the phosphorus oxide having a weight percentage in the range of 4-9% with respect to the total weight of the catalyst, the molybdenum oxide having a weight percentage in the range of 15-26% with respect to the total weight of the catalyst, the nickel oxide having a weight percentage in the range of 4-7% with respect to the total weight of the catalyst, the at least one porous support, i.e., γ-alumina having a weight percentage in the range of 40-65% with respect to the total weight of the catalyst, and the at least one chelating agent, i.e., either citric acid or glutamic acid or a combination of citric and glutamic acid having a weight percentage in the range of 1-7% with respect to the catalyst. This hydrodesulfurization catalyst had a BET surface area in the range of 155 to 210 m$^2$/g. If the weight percentages of the components as mentioned above were varied beyond the lower and upper limits the incorporation of the active phase within the porous framework was highly compromised, i.e., the BET surface area was low, thereby affecting the catalytic performance. Additionally, the content of heptamolybdate species (active sites) was found to be low if the weight percentages of the components as mentioned above was beyond the specified values. It was confirmed through UV spectroscopy that lower loadings of metals eventually affected the overall activity of the catalyst. By increasing the weight percentage of metal oxides in beyond the upper limit, pore size of the catalyst was compromised, i.e., minimized because of excess metal loading which again eventually adversely affected the activity. Therefore, the hydrodesulfurization catalyst comprising phosphorus oxide having a weight percentage in the range of 4-9% with respect to the total weight of the catalyst, the molybdenum oxide having a weight percentage in the range of 15-26% with respect to the total weight of the catalyst, the nickel oxide having a weight percentage in the range of 4-7% with respect to the total weight of the catalyst, the at least one porous support, i.e., γ-alumina having a weight percentage in the range of 40-65% with respect to the total weight of the catalyst, and the at least one chelating agent, i.e., either citric acid or glutamic acid or a combination of citric and glutamic acid having a weight percentage in the range of 1-7% with respect to the catalyst, was crucial to maintain the higher activity of catalyst.

Example 3: Analysis of the Textural Properties of Synthesized Catalyst (Desulfurization Catalyst)

The BET surface area, pore size, and pore volumes of the synthesized catalysts were measured on Quantachrome Autosorb IQ using N$_2$ adsorption-desorption at −196° C. Prior to measurement, the samples were degassed at 250° C. for 3 hours to remove impurities or moisture. The Brunauer-Emmett-Teller (BET) method was used to calculate the surface area of the catalyst and it was found to be in the range of 155 to 210 m$^2$/g. The Barret-Joyner-Halenda (BJH) desorption method was used to calculate the pore size distribution. Through the BJH desorption method, it was found out that the catalyst had a total pore volume in the range of 0.3 to 0.45 cm$^3$/g, and an average pore size in the range of 6 to 12 nm. The catalyst synthesized by the process of the present disclosure provides a highly dispersed active phase for efficient catalytic performance.

Further, Transmission Electron Microscopy (TEM) Analysis was used to confirm the metal dispersion in the sulfide catalyst Microstructural analysis of sulfided catalyst was performed on a JEOL transmission electron microscope and was recorded as FIG. 1. FIG. 1 clearly shows that the slabs of MoS$_2$ are well dispersed within the catalyst.

Example 4: UV Spectral Analysis

Figure 2:
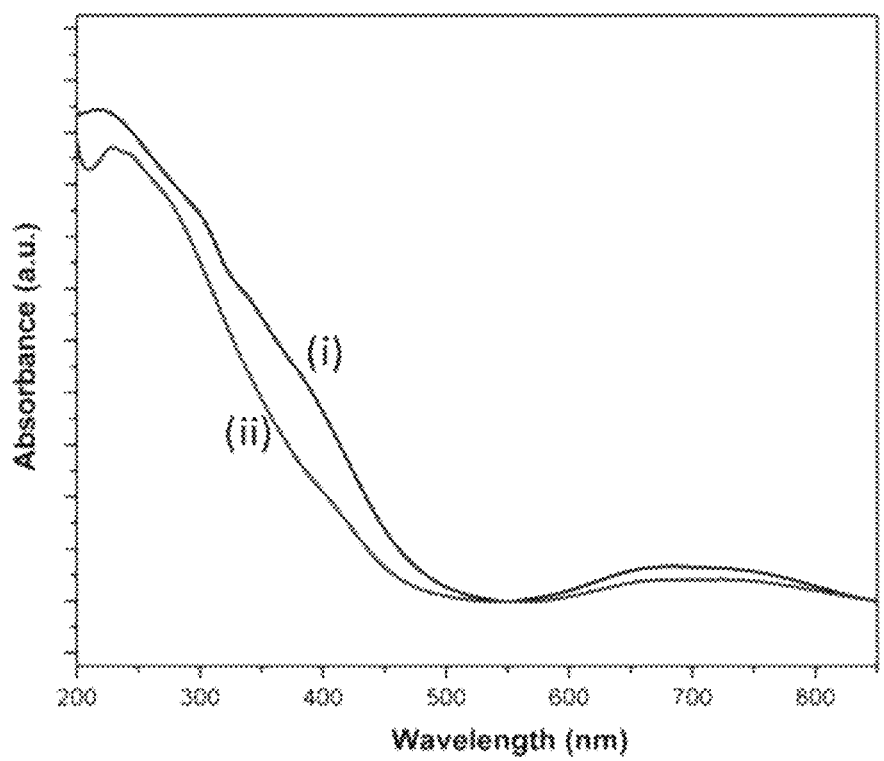
FIG. 2 illustrates the UV-spectral analysis of catalyst prepared by the process of present disclosure and catalyst prepared by the conventional wet impregnation method, in accordance with an implementation of the present disclosure.

FIG. 2 shows the UV-spectral analysis of (i) catalyst prepared by the process of the present disclosure; (ii) catalyst prepared by a conventional wet impregnation process. The presence of heptamolybdate species, which is the key pre-cursor was approximately 30% higher in the catalyst prepared by the process of the present disclosure in comparison to the catalyst prepared by wet impregnation method.

Example 5: X-Ray Photoelectron Spectroscopy Analysis

Figure 3:
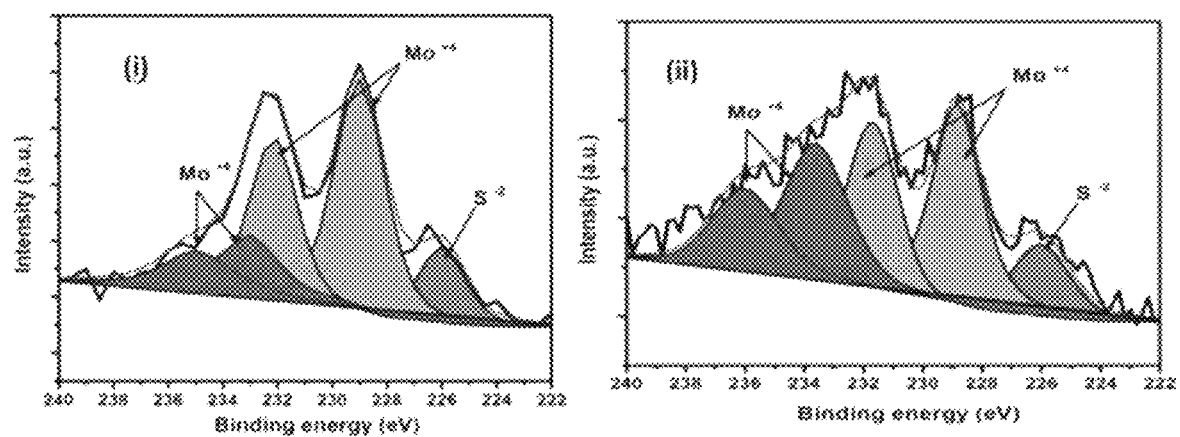
FIG. 3 illustrates the (i) X-ray photoelectron spectroscopic analysis of the catalyst of the present disclosure and (ii) X-ray photoelectron spectroscopic analysis of the catalyst prepared by the conventional wet impregnation method, in accordance with an implementation of the present disclosure.

XPS analysis was employed to obtain information about the surface composition of the catalyst, i.e., species identification and chemical state of the transition metal over γ-alumina surface. FIG. 3 shows the x-ray photoelectron spectroscopy of the catalyst after the hydrodesulfurization process. FIG. 3 (i) illustrates the of molybdenum species in the desulphurization Mo 3d (i) present disclosure (ii) conventional methodology. The active sites for hydrodesulfurization was MoS$_2$. Using XPS the MoS$_2$ in the catalyst was quantified. +4 oxidation state of Mo refers to MoS$_2$ and +6 oxidation state refers to MoO$_3$ phase. MoO$_3$ in catalyst after sulfidation were the inactive sites. It is clear from FIG. 3 that the quantity of MoS$_2$ was more in comparison to the MoO$_3$ sites.

Example 6: Temperature-Programmed Reduction by Hydrogen (TPR-H$_2$) Analysis of the Synthesized Catalysts (Hydrodesulfurization Catalyst)

Figure 4:
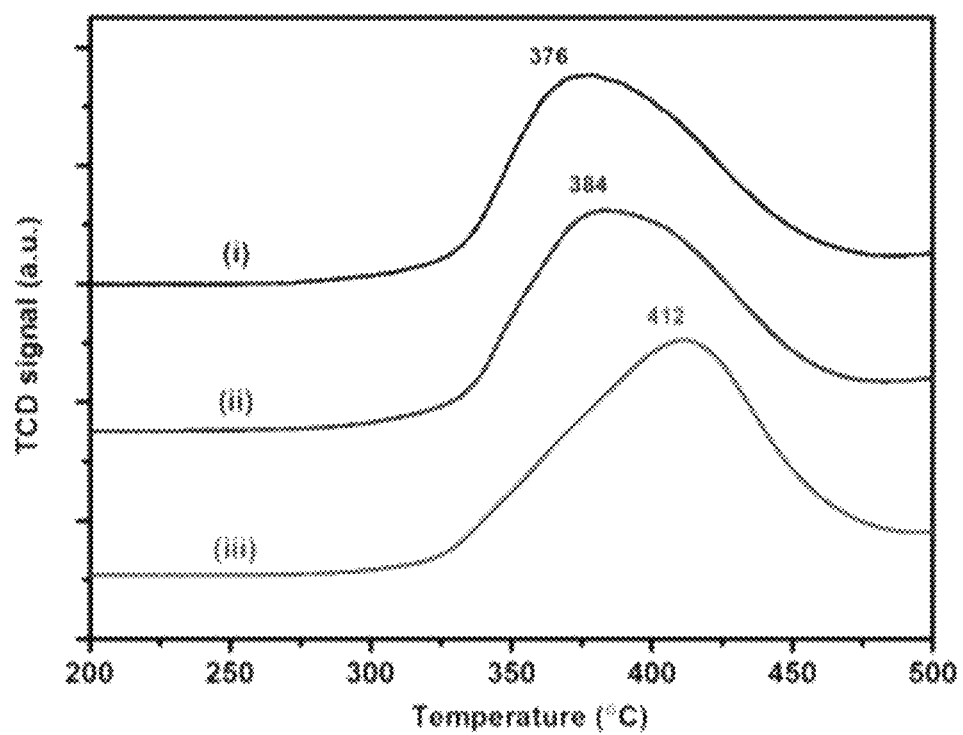
FIG. 4 illustrates the graph obtained from temperature-programmed reduction by hydrogen, in an accordance with an implementation of the present disclosure.

Temperature-programmed reduction (TPR) is a widely used tool for the characterization of metal oxides, mixed metal oxides, and metal oxides dispersed on a support. FIG. 4 shows the temperature-programmed reduction by hydrogen (H$_2$-TPR) results of hydrodesulfurization catalyst prepared by (i) process of the present disclosure, wherein combination of citric acid and glutamic acid was used as chelating agent (ii) process of present disclosure, wherein citric acid was used as chelating agent; and (iii) conventional wet impregnation with citric acid as chelating agent. It is clear from FIG. 4 that the $T_{max}$ reduction temperature of catalysts were in the following order (i)<(ii)<(iii)

It is thus evident that catalysts prepared by the present disclosure wherein combination of citric acid and glutamic acid were used as chelating agent forms $MoS_2$ at a lower temperature during sulfidation when compared to other combination of chelating agents and impregnation techniques. Because of the strong interaction between active phase and support for conventional impregnation technique, $MoS_2$ formation slows down and shifts to a higher temperature which eventually affects the $MoS_2$ content in the final catalysts.

Example 7: Performance Evaluation of the Hydrodesulfurization Catalyst

Performance evaluation of the synthesized catalysts was performed in a fixed bed reactor of volume 200 mL using a hydrocarbon feedstock. 50 g of catalyst was loaded with inerts. To resemble the actual working of the hydrodesulfurization catalyst the catalyst was sulfided with the sulfiding agent, dimethyl-disulfide. 1% of dimethyl-disulfide was added to the hydrocarbon feedstock (diesel) and sulfidation was done at 250° C., 5 MPa $H_2$ pressure for 4 hours and 350° C. 5 MPa bar $H_2$ pressure for 5 hours along with the hydrodesulfurization catalyst of the present disclosure. For example, the hydrocarbon feedstock was varied in the weight percentage range of 500 g to 3000 g and the hydrodesulfurization catalyst used for the above-mentioned feedstock range was 1000 g. The metal oxides present in the catalyst converted to sulfide state which were the active sites and accordingly the ppm levels of sulfur were calculated and are recorded in Table 1 and Table 2.

The initial sulfur content of the hydrocarbon feedstock was 5000-15000 ppm. The process conditions were WHSV: 0.6 $hr^{-1}$, $H_2$/HC: 575 $Nm^3/m^3$, Pressure: 2-10 MPa. Table 1 presents the sulfur contents of the products at different reaction temperatures, and Table 2 presents the sulfur contents of the products at different times. The operating conditions in Table 2 were the same as provided for Table 1, however, the temperature was 343° C. and pressure was 8 MPa.

TABLE 1

| Operating conditions | Sulfur in the feed (ppm) | Product Sulfur, (ppm) | |
|---|---|---|---|
| | | **catalyst prepared by conventional wet impregnation method | Catalyst of the present disclosure |
| WABT: 338° C. | 5000-15000 | 20 | 13 |
| WABT: 343° C. | 5000-15000 | 9 | 6 |

*WABT = weighted average bed temperature
**conventional = the hydrodesulfurization catalyst was prepared by the wet impregnation method.

As a comparative example, the catalyst was prepared by a conventional method, wherein active metal precursors of $P_2O_5$, $MoO_3$ and NiO were loaded on alumina along with chelating agents using wet impregnation in one step and were eventually calcined to obtain the catalyst.

During hydrotreating of hydrocarbon feedstocks, catalyst activity decreases with time on stream as coke accumulates on the catalyst surface. However, it is clear from the time on stream study provided in Table 2, that the catalyst of the present disclosure possessed superior catalytic performance and selectivity for direct hydrodesulfurization.

TABLE 2

| Time on stream study | |
|---|---|
| Time, Hr | Product Sulfur, ppm* |
| 28 | 5 |
| 36 | 5 |
| 44 | 8 |
| 52 | 5 |
| 60 | 8 |
| 68 | 5 |
| 76 | 9 |
| 84 | 7 |
| 92 | 2 |
| 100 | 4 |
| Average | 5.8 |

The results showed a significant variation in the performance of the synthesized catalyst, which indicates the influence of the preparation method (sequence of impregnating metals in presence/absence of chelating agents, method of impregnation (spray impregnation), calcination temperature, and pH.

Advantages of the Present Subject Matter

Overall, the present disclosure discloses a hydrodesulfurization (HDS) catalyst comprising: (a) phosphorus oxide having weight percentage in the range of 4-9% with respect to the total weight of the catalyst, (b) molybdenum oxide having weight percentage in the range of 15-26% with respect to the total weight of the catalyst; (c) nickel oxide having weight percentage in the range of 4-7% with respect to the total weight of the catalyst; (d) at least one porous support having weight percentage in the range of 40-65% with respect to the total weight of the catalyst; and (e) at least one chelating agent having weight percentage in the range of 1-7% with respect to the catalyst, wherein the hydrodesulfurization catalyst has a BET surface area in the range of 155 to 210 $m^2/g$, and a process of preparation of the hydrodesulfurization catalyst. The hydrodesulfurization catalyst of the present disclosure may find application in various refineries. Also, the hydrodesulfurization catalyst and its process of preparation can enhance the usefulness of existing technology by functioning more effectively in terms of the formation of active centers will be relatively high when compared catalyst prepared by wet impregnation techniques. The process of preparation of the hydrodesulfurization catalyst of the present disclosure can also be applied for catalysts design for the vegetable oil conversion to aviation fuels.

The invention claimed is:
1. A hydrodesulfurization catalyst consisting of:
(a) a first metal oxide having a weight percentage in a range of 4-9% with respect to a total weight of the hydrodesulfurization catalyst;
(b) a second metal oxide having a weight percentage in a range of 15-26% with respect to the total weight of the hydrodesulfurization catalyst;
(c) a third metal oxide having a weight percentage in a range of 4-7% with respect to the total weight of the hydrodesulfurization catalyst;
(d) γ-alumina in a weight percentage in a range of 40-65% with respect to the total weight of the hydrodesulfurization catalyst; and
(e) at least one chelating agent having a weight percentage in a range of 1-7% with respect to the total weight of the hydrodesulfurization catalyst, wherein the at least one chelating agent is a combination of citric acid and glutamic acid, and wherein the hydrodesulfurization catalyst has a BET surface area in a range of 155 to 210 m$^2$/g.

2. The hydrodesulfurization catalyst as claimed in claim 1, wherein the first metal oxide is phosphorus oxide; the second metal oxide is selected from the group consisting of molybdenum oxide, tungsten oxide, and combinations thereof; and the third metal oxide is selected from the group consisting of cobalt oxide, nickel oxide, and combinations thereof.

3. A hydrodesulfurization (HDS) catalyst consisting of:
(a) phosphorus oxide having a weight percentage in a range of 4-9% with respect to a total weight of the hydrodesulfurization catalyst;
(b) molybdenum oxide having a weight percentage in a range of 15-26% with respect to the total weight of the hydrodesulfurization catalyst;
(c) nickel oxide having a weight percentage in a range of 4-7% with respect to the total weight of the hydrodesulfurization catalyst;
(d) γ-alumina in a weight percentage in a range of 40-65% with respect to the total weight of the hydrodesulfurization catalyst; and
(e) at least one chelating agent having a weight percentage in a range of 1-7% with respect to the total weight of the hydrodesulfurization catalyst, wherein the at least one chelating agent is a combination of citric acid and glutamic acid, and wherein the hydrodesulfurization catalyst has a BET surface area in a range of 155 to 210 m$^2$/g.

4. The hydrodesulfurization catalyst as claimed in claim 1, wherein the hydrodesulfurization catalyst has a surface acidity in a range of 0.3 to 0.5 mmol/g.

5. The hydrodesulfurization catalyst as claimed in claim 1, wherein the hydrodesulfurization catalyst has a total pore volume in a range of 0.3 to 0.45 cm$^3$/g, and an average pore size in a range of 6 to 12 nm.

6. A process of preparing the catalyst as claimed in claim 3, the process consisting of:
(a) impregnating a phosphorus oxide precursor on a porous support of γ-alumina, followed by drying and calcination to obtain a first precursor;
(b) dispersing a molybdenum oxide precursor on the first precursor in presence of at least one chelating agents, followed by ageing, drying, and calcination to obtain a second precursor; and
(c) impregnating a nickel oxide precursor on the second precursor in the presence of at least one chelating agent, followed by drying to obtain the catalyst, wherein the at least one chelating agent is a combination of citric acid and glutamic acid.

7. The process as claimed in claim 6, wherein the phosphorus oxide precursor is selected from the group consisting of orthophosphoric acid, diammonium hydrogen phosphate, ammonium dihydrogen phosphate, hypophosphorous acid, and combinations thereof; the molybdenum oxide precursor is selected from the group consisting of ammonium heptamolybdate, molybdophosphic acid, molybdenum oxide, molybdenum chloride, and combinations thereof; the nickel oxide precursor is selected from the group consisting of nickel acetate, nickel nitrate, nickel acetylacetonate, nickel chloride, and combinations thereof.

8. The process as claimed in claim 6, wherein impregnating the phosphorus oxide precursor on the porous support of γ-alumina is carried out by spray impregnation at a pH in the range of 2-5.5.

9. The process as claimed in claim 6, wherein the drying and calcination of step (a) is carried out at a temperature in the range of 400-500° C.

10. The process as claimed in claim 6, wherein dispersing the molybdenum oxide precursor on the first metal precursor in presence of at least two chelating agents is carried out at a pH in the range of 2-5.5.

11. The process as claimed in claim 6, wherein the ageing of step (b) is carried out at a temperature in the range of 25-35° C. for a period in the range of 2-5 hours; the drying of step (b) is carried out at a temperature in the range of 80-100° C.; the calcination of step (b) is carried out at a temperature in the range of 450-600° C.

12. The process as claimed in claim 6, wherein impregnating the nickel oxide precursor on the second precursor in the presence of at least one chelating agent is carried out by spray impregnation at a pH in the range of 4.5-5.5.

13. The process as claimed in claim 6, wherein the drying of step (c) is carried out at a temperature in the range of 80-100° C. for a period in the range of 5-8 hours.

14. A method of hydrodesulfurizing a hydrocarbon feedstock, the method comprising:
contacting the hydrocarbon feedstock comprising at least one sulfur-containing hydrocarbon compound with the hydrodesulfurization catalyst as claimed in claim 1, in the presence of hydrogen gas to hydro-desulfurize the at least one sulfur-containing hydrocarbon compound to form hydrogen sulfide and a hydro-desulfurized hydrocarbon compound,
wherein the hydrocarbon feedstock is contacted with the hydrodesulfurization catalyst at a temperature in the range of 200 to 500° C.

15. The method as claimed in claim 14, wherein the pressure of the hydrogen gas is in the range of 2 to 10 MPa.

16. The method as claimed in claim 14, wherein the hydrocarbon feedstock to the hydrodesulfurization catalyst, weight percentage ratio is in the range of 500 g-3000 g: 1000 g.

\* \* \* \* \*